(12) United States Patent
Hiraki et al.

(10) Patent No.: US 6,836,417 B2
(45) Date of Patent: Dec. 28, 2004

(54) SEMICONDUCTOR INTEGRATED CIRCUIT WITH SELECTABLE POWER SUPPLY ACCORDING TO DIFFERENT OPERATION MODES

(75) Inventors: Mitsuru Hiraki, Kodaira (JP); Takayasu Ito, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/804,086

(22) Filed: Mar. 19, 2004

(65) Prior Publication Data

US 2004/0174148 A1 Sep. 9, 2004

Related U.S. Application Data

(63) Continuation of application No. 10/170,630, filed on Jun. 14, 2002, now Pat. No. 6,737,839, which is a continuation of application No. 09/756,868, filed on Jan. 10, 2001, now Pat. No. 6,424,128.

(30) Foreign Application Priority Data

Jan. 20, 2000 (JP) ........................................ 2000-012128

(51) Int. Cl.$^7$ ............................................. G05F 1/59
(52) U.S. Cl. ...................................... 363/268; 363/272
(58) Field of Search ............................... 323/268, 271, 323/272

(56) References Cited

U.S. PATENT DOCUMENTS

| 3,922,526 A | 11/1975 | Cochran ...................... 235/152 |
| 4,502,152 A | 2/1985 | Sinclair ....................... 323/268 |
| 4,719,404 A | 1/1988 | Ekstrand ..................... 323/268 |
| 5,083,078 A | 1/1992 | Kubler et al. ................ 323/268 |
| 5,262,712 A | 11/1993 | Klotzig et al. .............. 323/268 |
| 5,548,206 A | 8/1996 | Soo ............................. 323/284 |
| 5,764,099 A | 6/1998 | Hewitt ......................... 327/545 |
| 5,777,399 A | 7/1998 | Shibuya ....................... 307/66 |
| 5,818,781 A | 10/1998 | Estakhri et al. ............. 365/226 |
| 5,864,225 A | 1/1999 | Bryson ....................... 323/268 |
| 6,130,525 A | 10/2000 | Jung et al. .................. 323/272 |
| 6,195,306 B1 | 2/2001 | Horiguchi et al. .......... 365/226 |
| 6,249,110 B1 | 6/2001 | Geyer et al. ................. 323/272 |
| 6,424,128 B1 | 7/2002 | Hiraki et al. ................ 323/268 |
| 6,667,603 B2 * | 12/2003 | Hiraki et al. ................ 323/268 |
| 6,737,839 B2 * | 5/2004 | Hiraki et al. ................ 323/268 |

FOREIGN PATENT DOCUMENTS

| JP | 05-260727 | 10/1993 | .......... H02M/3/155 |
| WO | WO 95/09475 | 4/1995 | .......... H02M/3/158 |

* cited by examiner

Primary Examiner—Jeffrey Sterrett
(74) Attorney, Agent, or Firm—Miles & Stockbridge P.C.

(57) ABSTRACT

For an internal circuit having a first operation mode consuming a first operational current and a second operation mode consuming a second operational current, which is smaller than the first operational current, a first power source regulator for stepping down a predefined output power supply voltage from an input power supply voltage and having a current supply ability corresponding to the first operational current of the internal circuit and a second power source gulator having a current supply ability corresponding to the second operational current are combined in order to, under the control of a power supply control unit, operate the first step-down type regulator in response to a first control signal instructing the first operation mode in the internal circuit and to operate the second step-down type regulator in response to a second control signal instructing the second operation mode. In this case, the internal circuit and power supply control unit are provided in one semiconductor integrated circuit device so that reduced power consumption and power supply switching in accordance with the operation mode can be achieved.

18 Claims, 14 Drawing Sheets

SEMICONDUCTOR INTEGRATED CIRCUIT WITH SELECTABLE POWER SUPPLY ACCORDING TO DIFFERENT OPERATION MODES

CROSS-REFERENCE TO RELATED APPLICATION

This application is a continuation of application Ser. No. 10/170,630 filed Jun. 14, 2002, now U.S. Pat. No. 6,737,839, which is a continuation of application Ser. No. 09/756,868 filed Jan. 10, 2001 now U.S. Pat. No. 6,424,128.

BACKGROUND OF THE INVENTION

The present invention relates to an electronic device, a semiconductor integrated circuit and a data processing system and mainly to a technology effective to be applied to a power supply technology for a battery-driven mobile electronic device.

Standard power supply voltage (such as 3.3 V) has been continuously used for interface between semiconductor chips. On the other hand, pressure resistance of a transistor is decreasing with is improvement of micronization. Thus, internal power supply voltage of a large scale integrated circuit (LSI) directs to be lower voltage for every generation. However, the internal power supply voltage is generally different by each chip in such the LSI. Therefore, when the internal power supply is supplied from a power supply on an implemented board, a number of power supplies equal to a given number of chips must be prepared, which increases in cost of a system and size of an implemented area.

As a technology for overcoming those problems, a method is known including the steps of providing a step-down type switching regulator excluding a smoothing circuit including an inductance and a capacitor on a chip, supplying only a standard power supply voltage Vcc for interface on the semiconductor chip and stepping down the voltage on each chip to generate an internal power supply voltage Vddi. The technology is disclosed in Proceedings of Custom Integrated Circuits Conference, May 1997, pp. 587–590 and International Solid-State Circuits Conference, Digest of Technical Papers, February 1999, pp. 156–157.

According to the conventional technology, the internal circuit on the chip is in a stand-by state (for example, a state where a built-in CPU clock is stopped). Thus, when its load current is significantly small, a power conversion efficiency is reduced extremely. As a result, the switching regulator consumes electric power significantly though only a small amount of power needs to be supplied to the internal circuit. This is because AC power consumed by a switching operation for an output MOSFET, which forms an output pulse within the switching regulator is unnegligiblly larger than an output power. Especially in a mobile electronic device, a power loss during such stand-by may reduce a battery lifetime, which is an important performance indicator of the mobile device.

An inventor hereof has realized in Japanese Patent Laid-Open No. 260727/93 and International Patent Publication No. WO 95/09475, through researches of publicly known technologies after the present invention was made, that a power supply had disclosed which combined a switching regulator and a series regulator used them differently through output current in order to reduce power losses. However, the power supply device monitors the output current in order to switch between them, which appears rational. Yet, in an electronic device such as a microcomputer, currents consumed differ largely between the stand-by state where the central processing unit (CPU) and others perform any operations and an operating state where data processing is performed. Especially, a transition time from the stand-by state to the operating state consumes large current rapidly. Therefore, even when the consumed current is monitored for switching the power supply circuit as described above, voltage and/current required for CPU operations cannot be obtained, which may cause an error operation.

SUMMARY OF THE INVENTION

The present inventor hereof has focused on that a program-controlled electronic device such as the microcomputer sets an operation mode by itself and considered to attempt higher efficiency in the power supply device by using a control signal generated in the internal portion. Further, for the electronic device, the number of parts tends to be reduced by adopting a circuit element within the semiconductor integrated circuit device. However, The present inventor has notices that it was not always effective to have the circuit element built-in.

It is an object of the present invention to provide an electronic device, a semiconductor integrated circuit and a data processing system, which allow lower power consumption. It is another object of the present invention to provide an electronic device and a data processing circuit, which allows size reduction. Further, it is another object of the present invention to provide an electronic device and a data processing system, which allow size reduction and lower power consumption. These and other objects and novel features of the present invention will be apparent from description herein and accompanying drawings.

The present invention disclosed herein may be summarized briefly as follows:

For an internal circuit having a first operation mode consuming a first operational current and a second operation mode consuming a second operational current, which is smaller than the first operational current, a first step-down type regulator for stepping down a predefined output power supply voltage from an input power supply voltage and having a current supply ability corresponding to the first operational current of the internal circuit and a second step-down type regulator having a current supply ability corresponding to the second operational current are combined in order to, under the control of a power supply control unit, operate the first step-down type regulator in response to a first control signal instructing the first operation mode in the internal circuit and to operate the second step-down type regulator in response to a second control signal instructing the second operation mode. In this case, the internal circuit and power supply control unit are provided in one semiconductor integrated circuit device so that reduced power consumption and power supply switching in accordance with the operation mode can be achieved.

In an electronic device including a switching regulator for stepping down a predefined output power supply voltage from an input power supply voltage and a semiconductor integrated circuit device including an internal circuit operated by feeding from the switching regulator, the switching regulator may include a driver control circuit formed in the semiconductor integrated circuit device, an output circuit provided in the outside of the semiconductor integrated circuit device for generating an output pulse signal through a drive signal generated by the driver control circuit and an inductance and a capacitor for smoothing the output pulse signal. Thus, a number of pins of the semiconductor integrated circuit device can be decreased regardless of a maximum power supply current, which allows reduction of size and cost in addition to an increase in universality of the regulator circuit.

DETAILED DESCRIPTION OF THE PREFERRED EMBODIMENTS

Figure 1:
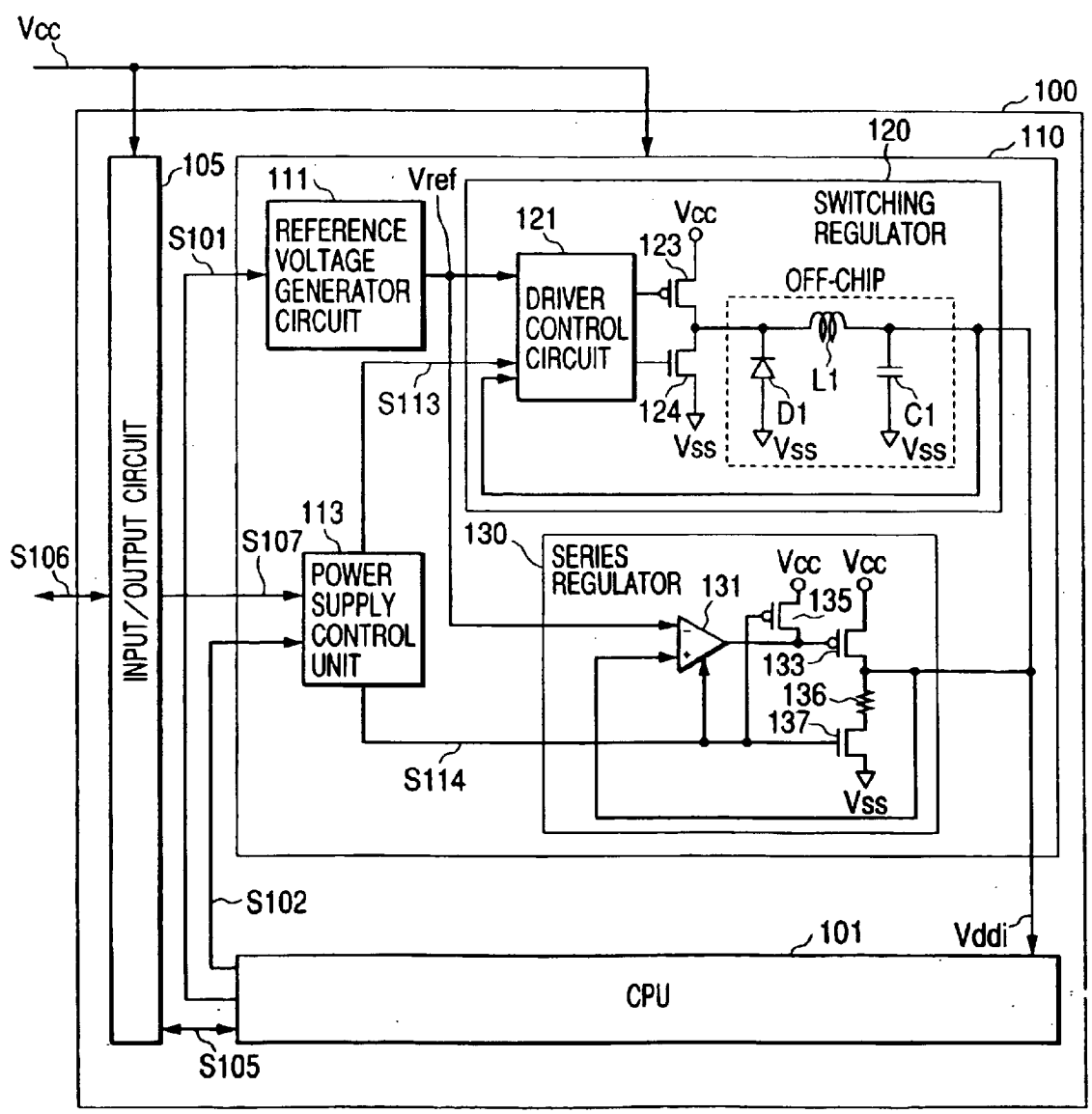
FIG. 1 is a block diagram of an essential part of one embodiment of an electronic device according to the present invention.

FIG. 1 shows a block diagram of an essential potion of one embodiment of an electronic device according to the present invention. The electronic device of the embodiment includes a smoothing circuit for a switching regulator having a diode D including a semiconductor integrated circuit device 100 and its external parts, an inductance (coil) L1 and a condenser C1. A battery for generating a power supply voltage Vcc is omitted here.

A term "MOS" herein may be understood that it stands for a metal oxide semiconductor configuration. However, recently, MOS may generally include an electric conductor of non-metal, such as polysilicon, instead of metal in an essential portion of the semiconductor device. Alternatively, it may include another insulator instead of oxide. CMOS also tends to be understood as having a broad meaning with the change in meaning of MOS as described above. Further, MOSFET is not narrowly understood but often understood as including a broad configuration as a virtual insulating gate field effect transistor. Terms CMOS and MOSFET of the present invention follow such general understanding.

Further, the present invention may be applied to not only an LSI including an MOS transistor but also an LSI including a bipolar transistor or a Bi-CMOS LSI including both bipolar type and MOS type transistors in accordance with LSI application environment. Furthermore, a technical application of the present invention is possible for an LSI using an LSI substrate made of not only silicon but also GaAs, for example.

Supplied from the outside of the semiconductor integrated circuit device 100 is power supply voltage Vcc to be used for interface between chips. The power supply voltage Vcc is fed to an input/output circuit 105 and, on the other hand, is fed to an internal circuit (such as CPU; including 1 chip microcomputer) 101 by being stepped down to an internal power supply voltage Vddi by an on-chip regulator circuit 110. The regulator circuit 110 includes a switching regulator 120 and a series regulator 130.

The switching regulator 120 includes a driver control circuit 121, a CMOS output circuit having a P-channel MOSFET 123 and an N-channel MOSFET 124, which are driven by the driver control circuit 121, and a smoothing circuit including a diode D having external parts of the semiconductor integrated circuit device 100, an inductance L1 and a capacitor C1.

The series regulator 130 includes a voltage comparator circuit 131, a P-type channel MOSFET 133 controlled by output voltage of the voltage comparator circuit 131 for operating as a variable resistance, a resistance 136 and an N-channel switch MOSFET 137 for flowing bias current of the P-channel MOSFET 133, and a P-channel switch MOSFET 135. When a signal S114 generated in a power supply control unit 113 is at a low level, the N-channel switch MOSFET 137 is turned to the OFF state and the P-channel MOSFET 135 is turned to the ON state. Further, the P channel MOSFET 133 is turned to the OFF state. As a result, its output has a high impedance state. In this case, the voltage comparator circuit 131 is shut down from the bias current by the low level of the signal S114.

The output power supply voltage Vddi from each of regulators 120 and 130 is controlled by a level substantially equal to a reference voltage Vref generated by a reference voltage generator circuit 111 in response to a control signal S 101 from the internal circuit 101. The power supply control unit 113 detects an operation mode of the semiconductor integrated circuit 100 in response to a control signal S102 supplied from the internal circuit 101 or a control signal S107 supplied through the input/output circuit 105 from the outside of the semiconductor integrated circuit device 100 and switches between operation/stop of the switching regulator 120 and the series regulator 130 based on the detected result.

An output from each of regulators 120 and 130 in the step state is controlled to be high impedance. When the internal circuit 101 is in the general operation state (called 'active state' hereinafter), the power supply control unit 113 controls to operate the switching regulator 120 through the control signal S113. On the other hand, when the internal circuit 101 is in the stand-by state (for example, a state where a clock of the internal circuit 113 is stopped), the power supply control unit 113 controls to terminates the switching regulator 120 through the control signal S113 and, at the same time, to operate the series regulator 130 through the control signal S114.

Figure 2:
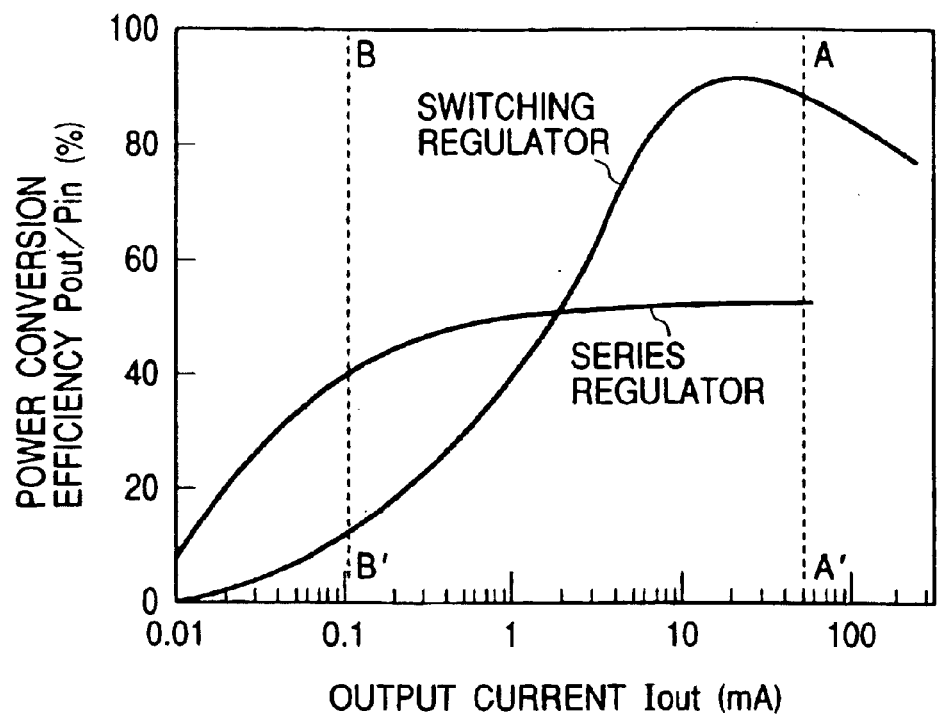
FIG. 2 is a characteristic diagram of an output/current to power conversion efficiency in a step-down circuit for describing the present invention.

In general, the maximum power conversion efficiency of the series regulator 130 gets worse than that of the switching regulator 120 as in a characteristic diagram of output current-power conversion efficiency around a line A–A' in FIG. 2. On the other hand, the series regulator 130 in a state having a lighter load as in the stand-by state does not cause much extreme deterioration of the power conversion efficiency as in a state around B–B' in FIG. 2. Therefore, in the stand-by state, the series regulator 130 having better power conversion efficiency is used instead of the switching regulator 120 with larger deterioration in the conversion efficiency so that power consumption in the stand-by state can be saved effectively.

In this embodiment, switching control between the switching regulator 120 and the series regulator 130 in accordance with an operation mode of the semiconductor integrated circuit device 100 is performed by the power supply control unit by using an operation mode signal. That is, when the internal circuit 101 such as CPU is switched from the stand-by state to the active state, the switching regulator 120 is used which has a sufficient load current supplying ability prior to the operation so that large load current caused when it is switched from the stand-by state to the active state can be handled, which allows rapid switching of the CPU, for example, from the stand-by state to the active state and ensures operations such as data processing in the switched active state.

TABLE 1

| State of CPU | Active | Stand-By | Shut-Down |
|---|---|---|---|
| Switching Regulator | Operates | Stops | Stops |
| Series Regulator | Stops | Operates | Stops |

The switching control of the switching regulator 120 and the series regulator 130 under the control of the power supply control unit in this embodiment can be summarized in Table 1. The operation mode often includes a shut-down mode (a state where the internal power supply voltage Vddi is shut down; data in a register, for example, will be lost) in addition to the active and stand-by states. Thus, the shut-down state is included in Table 1. In the shut-down state, both of regulators do not needs to be operated. Thus, both of them are stopped so that the power consumption can be reduced. However, the power supply control unit 113 and the input/output circuit 105 are operated through the power supply voltage Vcc, so that they can recover from the shut-down state to the active or stand-by (sleep) state. The reference voltage generator circuit 111 may be kept in operation state by the power supply voltage Vcc when its current consumption is a small amount. Alternatively, the operation current for analog circuits such as the voltage comparator circuit may be shut down under the control of the power supply control unit 113 if necessary.

Figure 4:
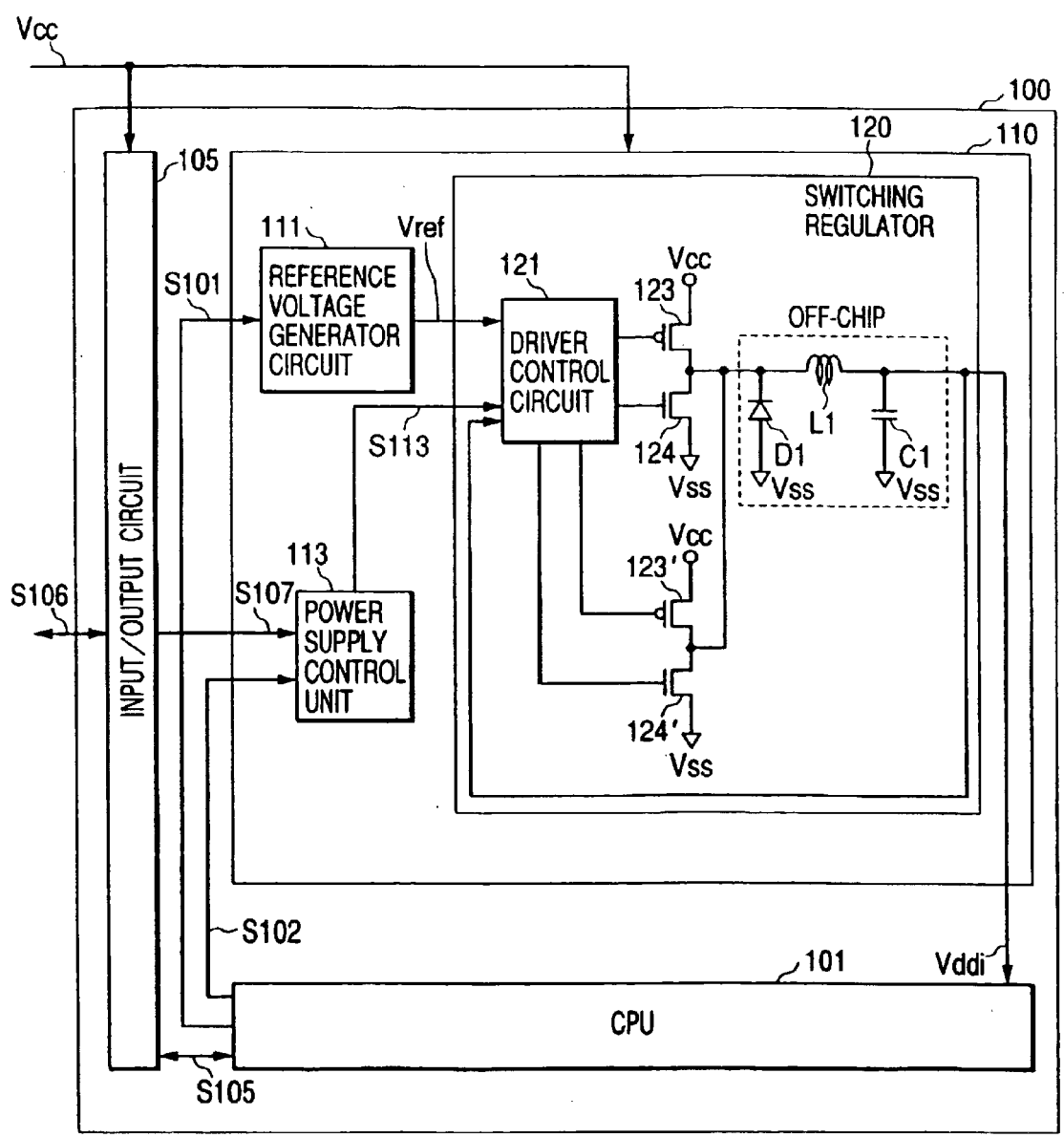
FIG. 4 is a block diagram of an essential part of another embodiment of an electronic device according to the present invention.

FIG. 4 shows a block diagram of an essential part of another embodiment of the electronic device according to the present invention. In this embodiment, a power supply circuit includes one switching regulator. However, two types of output circuits are provided for a smoothing circuit for the switching regulator including a diode D1 having a semiconductor integrated circuit device 100 and its external components, an inductance L1 and a condenser C1. MOSFETs 123 and 124 are output circuits for the active state while MOSFETs 123' and 124' are output circuits for the stand-by state, which performs equivalent operations to the series regulator.

Figure 3:
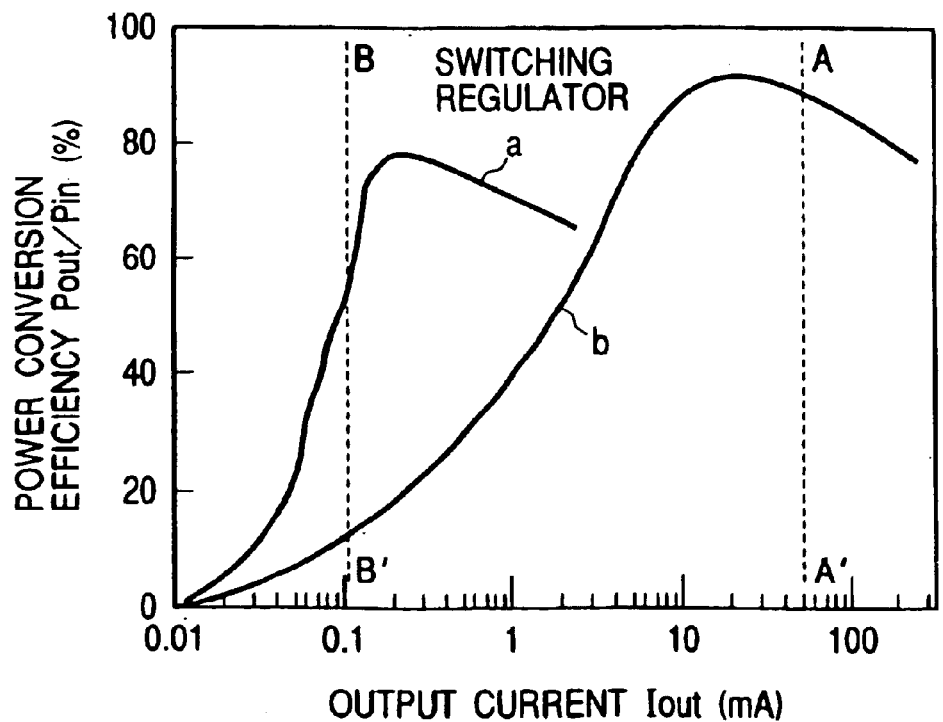
FIG. 3 is a characteristic diagram of an output/current to power conversion efficiency in step-down circuit for describing the present invention.

In the characteristic diagram in FIG. 2, the power conversion efficiency of the switching regulator is improved with a heavy load of an output current Iout because an amount of power losses in the smoothing circuit using the inductance L1 and the condenser C1 is extremely smaller than that of an output power Pout. On the other hand, it is because power consumed for driving the output MOSFETs 123 and 124 for supplying pulse signals to the smoothing circuit is relatively larger when the output current Iout has light loads. Therefore, as shown in a characteristic diagram a in FIG. 3, when the size of the MOSFETs for forming the output pulses are reduced, the efficiency can be increased with light loads. In consideration of this, two types of output circuits are provided as indicated above and switched under the control of the power supply control unit 113.

An output from the output circuits in the stop state is controlled so as to be high impedance. when the internal circuit 101 is in general operation state (active state, hereinafter), the power control unit 113 controls to operate the output MOSFETs 123 and 124 through a first state of a control signal S113 (where the output MOSFETs 123' and 124' are in OFF state). On the other hand, when the internal circuit 101 is in the stand-by state (for example, a clock for the internal circuit 113 is terminated), the power supply control unit 113 turns the output MOSFETs 123 and 124 to the OFF state through a second state of the control signal S113 in order to control to operate the output MOSFET 123' and 124' simultaneously. As a result, power consumption can be saved effectively as above by using them differently in accordance with the load state of the characteristics a and b in FIG. 3. The control by the power supply control unit 113 can be performed in the same manner as Table 1.

Figure 5:
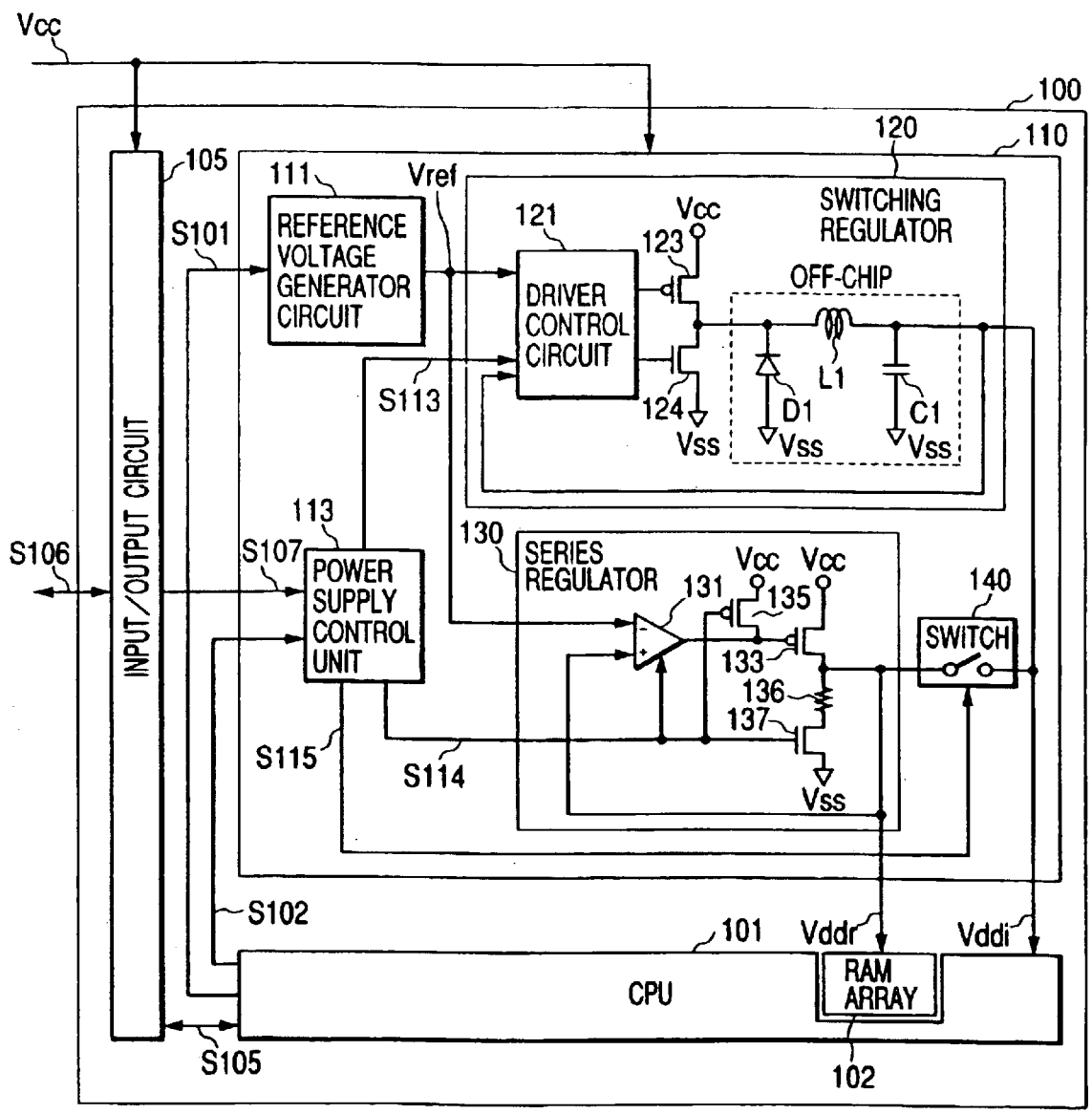
FIG. 5 is a block diagram of an essential part of another embodiment of an electronic device according to the present invention.

FIG. 5 shows a block diagram of an essential portion block diagram of another embodiment of the electronic device according to the present invention. Also in this embodiment, a power supply voltage Vcc to be used for the interface between chips is supplied from the outside of the semiconductor integrated circuit device 100 in the same manner as above. The power supply voltage Vcc is fed to the input/output circuit 105 while stepped down to the internal power supply voltage Vddi by the on-chip regulator circuit 110 in order to be fed to the internal circuit (such as CPU) 101. In this embodiment, the regulator circuit 110 feeds an internal power supply voltage Vddr equivalent to the internal power supply voltage Vddi to a random access memory (RAM) array 102.

The regulator circuit 110 includes a switching regulator 120 and a series regulator 130. Outputs from the switching regulator 120 are connected directly to a power supply line of the internal circuit 101. Outputs from the series regulator 130 are connected directly to a power supply line of the RAM array 102. Provided between the outputs from the switching regulator 120 and outputs from the series regulator 130 is a switch 140. Output power supply voltage from each of regulators 120 and 130 is controlled to a substantially equal level to a reference voltage Vref generated by the reference voltage generator circuit 111 in response to a control signal. S101 from the internal circuit 101.

The power supply control unit 113 detects an operation mode of the semiconductor integrated circuit 100 in response to a control signal S102 supplied from the internal circuit 101 or a control signal S107 supplied through the input/output circuit 105 from the outside of the semiconductor integrated circuit device 100 and switches between operation/stop of the switching regulator 120 and the series regulator 130 and ON/OFF of the switch 140 based on the detected result. An output from each of regulators 120 and 130 in the stop state is controlled to be high impedance.

When the internal circuit 101 is in the active state, the power supply control unit 113 controls to operate the switching regulator 120 through the control signal S113. At the same time, the power supply control unit 113 turns the switch 140ON through a control signal S115 and the output power supply voltage Vddi of the switching regulator 120 is fed to the RAM array 102 through the switch 140.

When the internal circuit 101 is in the stand-by state, the power supply control unit 113 controls to terminates the switching regulator 120 through the control signal S113 and, at the same time, to operate the series regulator 130 through the control signal S114 in order to turn the switch 140 ON through the control signal S115. The internal circuit 101 and the RAM array 102 are fed from the series regulator 130. Therefore, in the same manner as the embodiment in FIG. 1, the series regulator 130 is used instead of the switching regulator 120 in the stand-by state so that power consumption in the stand-by state can be saved effectively.

Further, this embodiment includes an operation mode for shutting down the power supply for the internal circuit 101 in order to hold data of the RAM array 102 only (RAM data holding state) In the RAM data holding state, the power supply control unit 113 terminates the switching regulator 120 through the control signal S113 and, at the same time, turns the switch 140 OFF through the control signal S115 in order to shut down the power supply for the internal circuit 101. On the other hand, the power supply control portion 113 controls to operate the series regulator 130 through the control signal S114.

Therefore, the series regulator 130 supplies electric power required by the RAM array 102 for holding data. In the RAM data holding state, the power supply for the internal circuit 101 is shut down. Thus, leak current of the internal circuit 101 can be zero completely, which allows saving more power consumption than the stand-by state. However, in the RAM data holding state, information written into a register, for example, within the internal circuit 101 is lost. Thus, information in the register may be transferred to the RAM before CPU shut-down/RAM data holding, if necessary. In the shut-down state, both switching regulator 120 and series regulator 130 are terminated. Switching controls for the switching regulator 120, series regulator 130 and the switch 140 in accordance with the operation modes in this embodiment will be summarized in Table 2 below:

TABLE 2

| CPU/RAM state | Active | Stand-By | CPU Shut-Down/RAM Data Holding | Shut-Down |
| --- | --- | --- | --- | --- |
| switching regulator | operate | stop | stop | Stop |
| series regulator | stop | operate | operate | Stop |
| Switch | ON | ON | OFF | ON |

Figure 6:
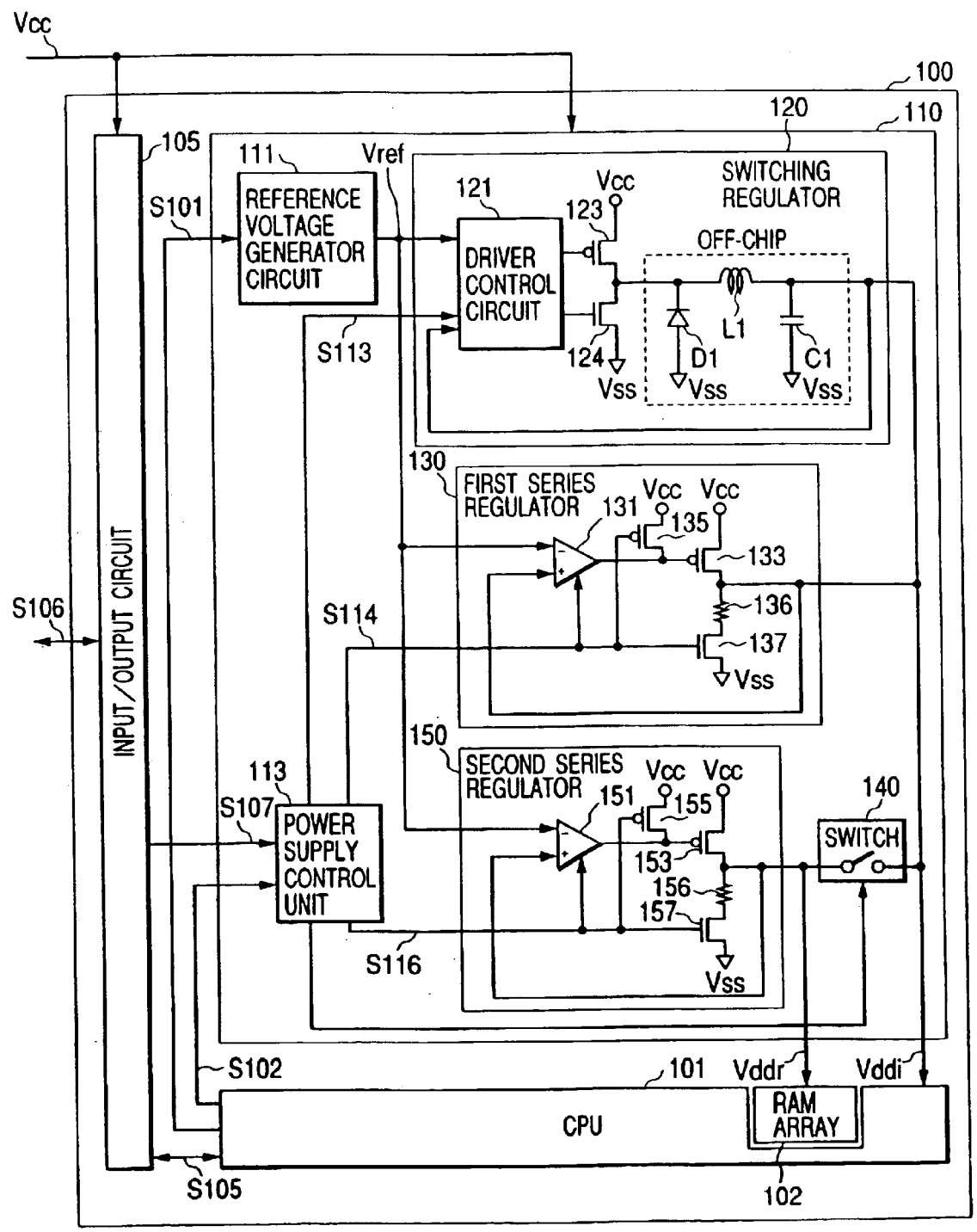
FIG. 6 is a block diagram of an essential part of another embodiment of an electronic device according to the present invention.

FIG. 6 shows a block diagram of an essential part of another embodiment of an electronic device according to the present invention. Also in this embodiment, in the same manner as above, the power supply voltage Vcc is fed to the input/output circuit 105 while stepped down to the power supply voltage Vddi by the on-chip regulator circuit 110 in order to be fed to the internal circuit 101 such as CPU. The regulator circuit 110 feeds an internal power supply voltage Vddr equivalent to the internal power supply voltage Vddi to the RAM array 102.

The regulator circuit 110 includes a switching regulator 120, a first series regulator 130 and a second series regulator 150. Outputs from the switching regulator 120 and the first series regulator 130 are connected directly to a power supply line of the internal circuit 101. Outputs from the second series regulator 150 are connected directly to a power supply line of the RAM array 102. Provided between the outputs from the switching regulator 120 and the first series regulator 130 and outputs from the second series regulator 150 is a switch 140.

Output power supply voltage from each of regulators 120, 130 and 150 is controlled to a substantially equal level to a reference voltage Vref generated by the reference voltage generator circuit 111 in response to a control signal S101 from the internal circuit 101. The power supply control unit 113 detects an operation mode of the semiconductor integrated circuit 100 in response to a control signal S102 supplied from the internal circuit 101 or a control signal S107 supplied through the input/output circuit 105 from the outside of the semiconductor integrated circuit device 100 and switches between operation/stop of the switching regulator 120, the first series regulator 130 and the second series regulator 150 and ON/OFF of the switch 140 based on the detected result. An output from each of regulators 120, 130 and 150 in the stop state is controlled to be high impedance.

When the internal circuit 101 is in the active state, the power supply control unit 113 controls to operate the switching regulator 120 through the control signal S113. At the same time, the power supply control unit 113 turns the switch 1400N through a control signal S115 and the output power supply voltage Vddi of the switching regulator 120 is fed to the RAM array 102 through the switch 140.

When the internal circuit 101 is in the stand-by state, the power supply control unit 113 controls to terminates the switching regulator 120 through the control signal S113 and, at the same time, to operate the first series regulator 130 through the control signal S114 in order to turn the switch 1400N through the control signal S115. The internal circuit 101 and the RAM array 102 are fed from the first series regulator 130. Therefore, in the same manner as the embodiment in FIG. 5, the first series regulator 130 is used instead of the switching regulator 120 in the stand-by state so that power consumption in the stand-by state can be saved effectively.

This embodiment includes a RAM data holding state as one of operation modes as in the embodiment in FIG. 5. In the RAM data holding state, the power supply control unit 113 terminates the switching regulator 120 through the control signal S113 and terminate the first series regulator 130 through the control signal S114. At the same time, the power supply control unit 113 turns the switch 140 OFF through the control signal S115 in order to shut dun the power supply for the internal circuit 101. On the other hand, the power supply control portion 113 controls to operate the second series regulator 150 through the control signal S116.

Therefore, the second series regulator 150 supplies electric power required by the RAM array 102 for holding data. In the RAM data holding state, the power supply for the internal circuit 101 is shut down. Thus, leak current of the internal circuit 101 can be zero completely, which allows saving more power consumption than the stand-by state. However, in the RAM data holding state, information written into a register, for example, within the internal circuit 101 is lost. Thus, information in the register may be transferred to the RAM before CPU shut-down/RAM data holding, if necessary.

This embodiment includes a second series regulator 150 dedicated for uses only in the RAM data holding state. Thus, the second series regulator 150 can be ideally designed so as to supply a minimum current required for RAM data holding. The power consumed by the second series regulator 150 itself is smaller than that consumed by the first series regulator 130 in the stand-by state, which allows more saving of power consumption in the RAM data holding state than that in the case of the embodiment in FIG. 5.

In the shut-down state, the switching regulator 120, the first series regulator 130 and the series regulator 150 are all terminated. Switching controls for the switching regulator 120, the first series regulator 130, the second series regulator 150 and the switch 140 in accordance with the operation modes in this embodiment will be summarized in Table 3 below:

TABLE 3

| CPU/RAM state | Active | Stand-By | CPU Shut-Down/RAM Data Holding | Shut-Down |
| --- | --- | --- | --- | --- |
| Switching regulator | operate | stop | stop | stop |
| 1st series regulator | stop | operate | stop | stop |
| 2nd series regulator | stop | stop | operate | stop |
| Switch | ON | ON | OFF | ON |

Figure 7:
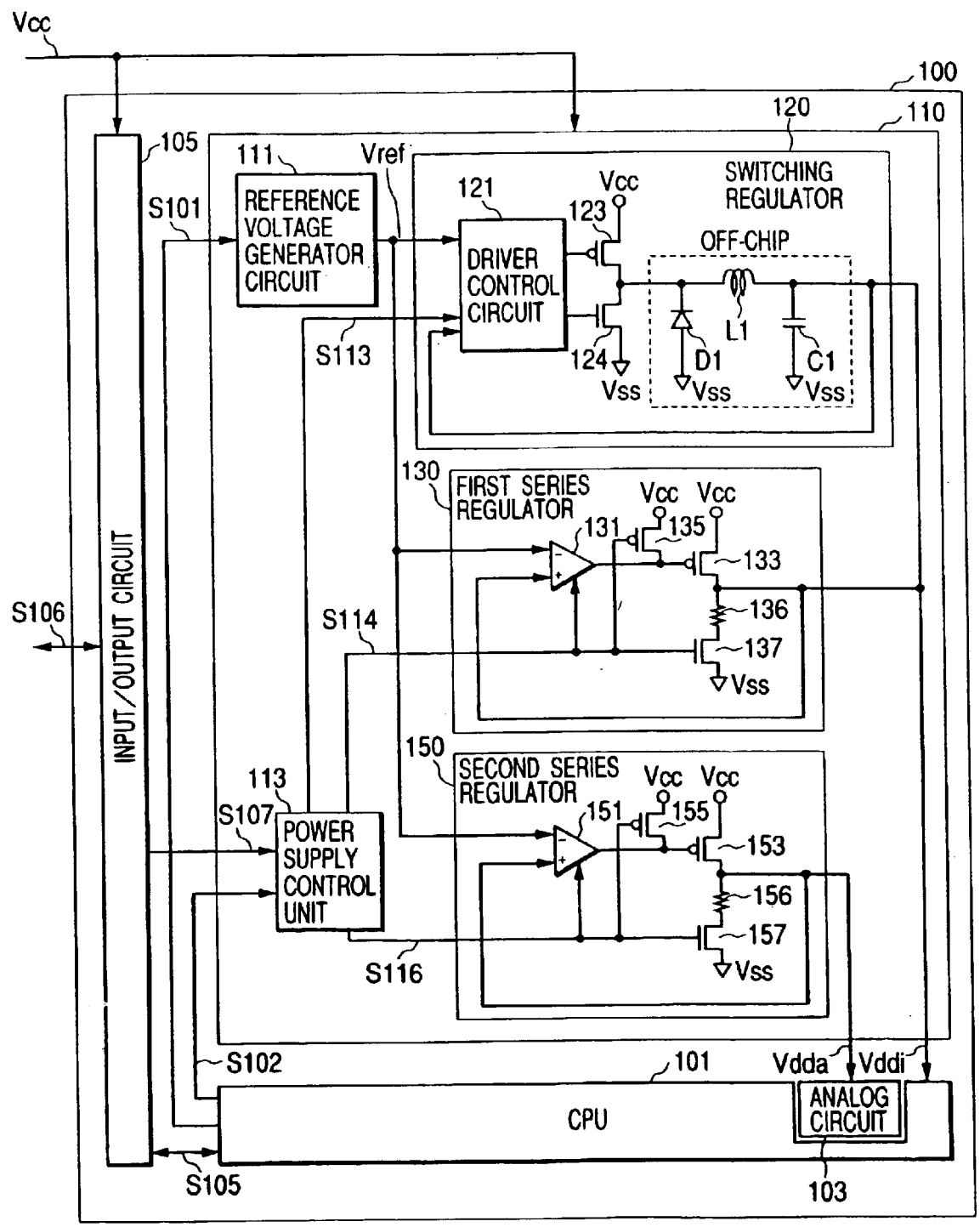
FIG. 7 is a block diagram of an essential part of another embodiment of an electronic device according to the present invention.

FIG. 7 shows a block diagram of an essential part of another embodiment of an electronic device according to the present invention. Also in this embodiment, in the same manner as above, the power supply voltage Vcc used for interface between chips is fed from the outside of the semiconductor integrated circuit device 100. The power supply voltage Vcc is fed to the input/output circuit 105 while stepped down to the internal power supply voltage Vddi by the on-chip regulator circuit 110 in order to be fed to the internal circuit 101 such as CPU. The regulator circuit 110 feeds an internal power supply voltage Vddr equivalent to the internal power supply voltage Vddi from an analog circuit 103 having phase locked loop (PLL) circuit for generating clock signals, which is in synchronous with clock signals supplied from the outside.

The regulator circuit 110 includes, in the same manner as above, a switching regulator 120, a first series regulator 130 and a second series regulator 150. Outputs from the switching regulator 120 and the first series regulator 130 are connected directly to a power supply line of the internal circuit 101. Outputs from the second series regulator 150 are connected directly to a power supply line of the analog circuit 103. Output power supply voltage from each of regulators 120, 130 and 150 is controlled to a substantially equal level to a reference voltage Vref generated by the reference voltage generator circuit 111 in response to a control signal S101 from the internal circuit 101.

The power supply control unit 113 detects an operation mode of the semiconductor integrated circuit 100 in response to a control signal S102 supplied from the internal circuit 101 or a control signal S107 supplied through the input/output circuit 105 from the outside of the semiconductor integrated circuit device 100 and switches between operation/stop of the switching regulator 120, the first series regulator 130 and the second series regulator 150 and ON/OFF of the switch 140 based on the detected result. An output from each of regulators 120, 130 and 150 in the stop state is controlled to be high impedance.

When the internal circuit 101 is in the active state, the power supply control unit 113 controls to operate the switching regulator 120 through the control signal S113. When the internal circuit 101 is in the stand-by state, the power supply control unit 113 controls to terminates the switching regulator 120 through the control signal S113 and, at the same time, to operate the first series regulator 130 through the control signal S114. Here, the internal circuit 101 is fed from the first series regulator 130. Therefore, in the same manner as the embodiment in FIG. 6, the first series regulator 130 is used instead of the switching regulator 120 in the stand-by state so that power consumption in the stand-by state can be saved effectively.

In this embodiment, both in the active state and in the stand-by state, the power supply control portion 113 controls to operate the second series regulator 150 through a control signal S116. Generally, a switching regulator causes a switching noise, which may have a bad effect on operations by the analog circuit 103. In this embodiment, the analog circuit 103 is always fed by the second series regulator 150. Thus, the bad effect can be avoided due to the switching noise from the switching regulator.

In the shut-down state, the switching regulator 120, the first series regulator 130 and the series regulator 150 are all terminated. Switching controls for the switching regulator 120, the first series regulator 130 and the second series regulator 150 in accordance with the operation modes in this embodiment will be summarized in Table 4 below:

TABLE 4

| CPU/RAM state | Active | Stand-By | Shut-Down |
| --- | --- | --- | --- |
| Switching regulator | operate | stop | stop |
| 1st series regulator | stop | operate | stop |
| 2nd series regulator | operate | operate | stop |

Figure 8:
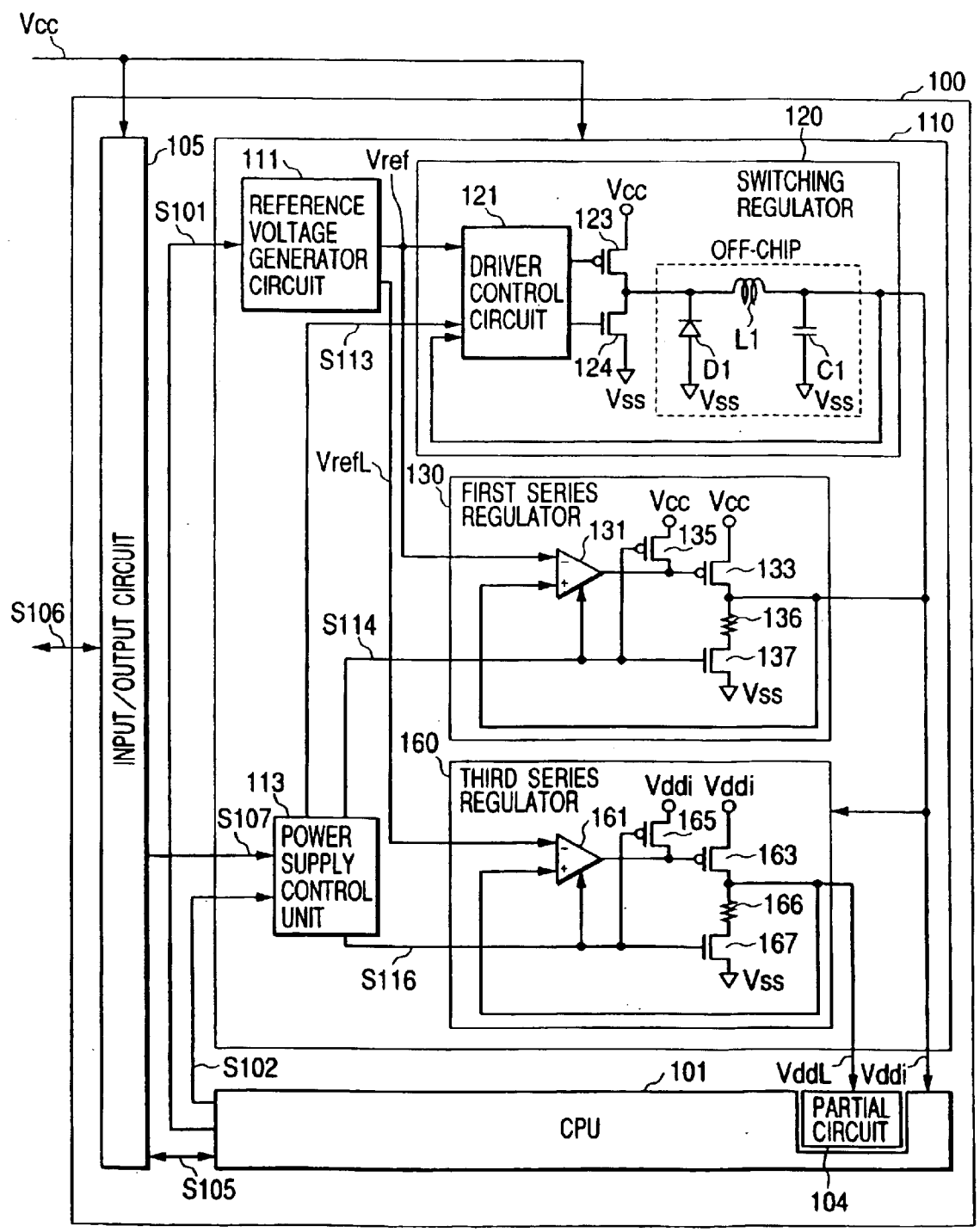
FIG. 8 is a block diagram of an essential part of another embodiment of an electronic device according to the present invention.

FIG. 8 shows a block diagram of an essential part of another embodiment of an electronic device according to the present invention. Also in this embodiment, in the same manner as above, the power supply voltage Vcc used for interface between chips is fed from the outside of the semiconductor integrated circuit device 100. The power supply voltage Vcc is fed to the input/output circuit 105 while stepped down to the internal power supply voltage Vddi by the on-chip regulator circuit 110 in order to be fed to the internal circuit 101 such as CPU. Further, output power supply voltage Vddi from the switching regulator 120 or the first series regulator 130 is stepped down to the internal power supply voltage VddL further by a third series regulator 160.

Outputs from the third series regulator 160 are directly connected to a power supply line of a partial circuit 104. Output power supply voltage Vddi from the switching regulators 120 and the first series regulator 130 is controlled to a substantially equal level to a reference voltage Vref generated by the reference voltage generator circuit 111 in response to a control signal S101 from the internal circuit 101. Further, output power supply voltage VddL from the third series regulator 160 is controlled to a substantially equal level to a reference voltage VrefL, which is lower than the reference voltage Vref generated by the reference voltage generator circuit 111 in response to a control signal S101 from the internal circuit 101.

The power supply control unit 113 detects an operation mode of the semiconductor integrated circuit 100 in response to a control signal S102 supplied from the internal circuit 101 or a control signal S107 supplied through the input/output circuit 105 from the outside of the semiconductor integrated circuit device 100 and switches between operation/stop of the switching regulator 120, the first series regulator 130 and the third series regulator 160 based on the detected result. In the same manner as above, an output from each of regulators in the stop state is controlled to be high impedance.

When the internal circuit 101 is in the active state, the power supply control unit 113 controls to operate the switching regulator 120 through the control signal S113. When the internal circuit 101 is in the stand-by state, the power supply control unit 113 controls to terminates the switching regulator 120 through the control signal S113 and, at the same time, to operate the first series regulator 130 through the control signal S114. Here, the internal circuit 101 is fed from the first series regulator 130. Therefore, in the same manner as the embodiment above, the first series regulator 130 is used instead of the switching regulator 120 in the stand-by state so that power consumption in the stand-by state can be saved effectively.

In this embodiment, both in the active state and in the stand-by state, the power supply control portion 113 controls to operate the third series regulator 160 through a control signal S116. Especially, the partial circuit 104 has a loose timing constraint. Thus, when no problem is caused on operations even if the power supply voltage of the partial circuit 104 is reduced to a lower voltage than the power supply voltage of the internal circuit 101, a regulator configuration as in this embodiment achieves lower power supply voltage VddL of the partial circuit 104 than the power supply voltage Vddi of the internal circuit 101. As a result, the power consumption can be saveed more effectively.

In the shut-down state, the switching regulator 120, the first series regulator 130 and the third regulator 160 are all terminated. Switching controls for the switching regulator 120, the first series regulator 130 and the third series regulator 160 in accordance with the operation modes in this embodiment will be summarized in Table 5 below:

TABLE 5

| CPU/RAM state | Active | Stand-By | Shut-Down |
|---|---|---|---|
| Switching regulator | operate | stop | stop |
| 1st series regulator | stop | operate | stop |
| 3rd series regulator | operate | operate | stop |

Figure 9:
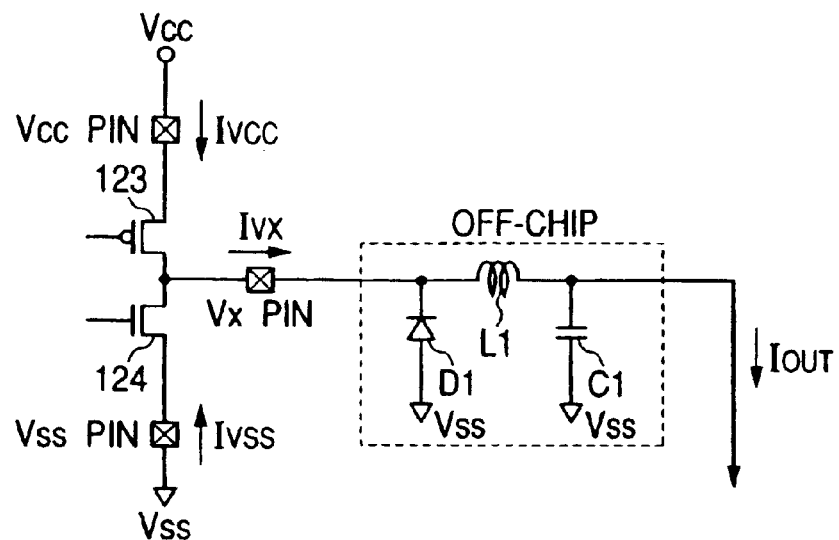
FIG. 9 is an explanatory diagram for describing the present invention.
Figure 10:
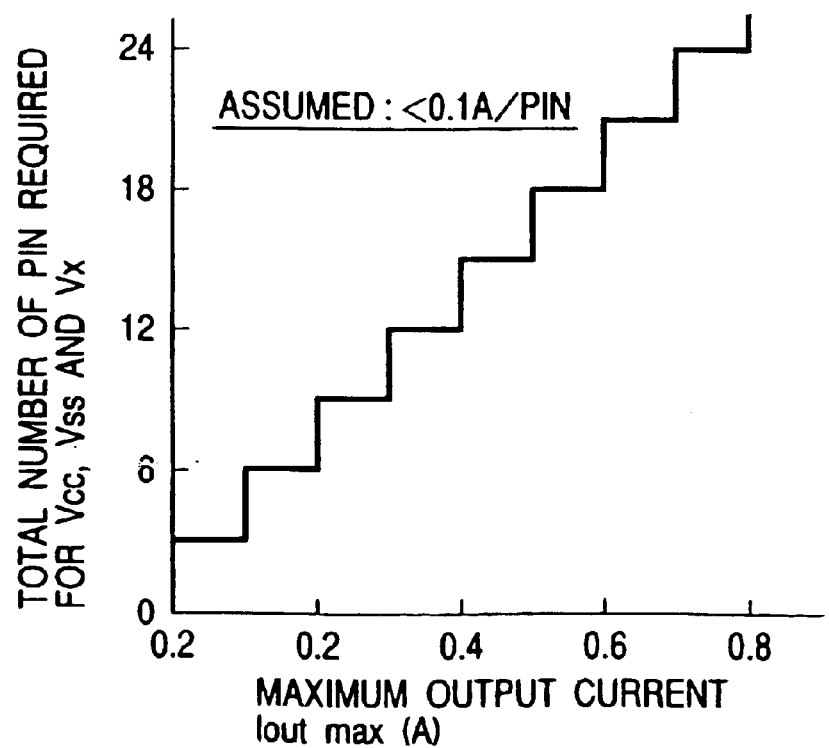
FIG. 10 is an explanatory diagram for describing the present invention.

FIGS. 9 and 10 show illustrative diagrams for describing another aspect of the present invention. When a switching regulator includes an output circuit formed in a semiconductor integrated circuit device and a smoothing circuit provided externally as in the embodiment in FIG. 1, current substantially equal to an output current I out flows through current paths Ivx, Ivcc and Ivss in FIG. 9. In order to form each of these current paths, three types of pins (Vx pin, Vcc pin, Vss pin) are needed.

Generally, there is an upper limit on an amount of current, which can be flown in one pin (for example, about 0.1 A per one pin generally). Thus, when the output current Iout exceeds the upper limit, the number of the three types of pins must be increased as in FIG. 10 in proportion to the output current Iout. However, the increase in the number of pins also increase the chip size, which increases costs, therefore, there is a practical limit on an acceptable number of pins (therefore maximum output current limited by that). That is, as shown in FIG. 10, when the maximum output current 0.2 A (Ampere), the total number of the three kinds of pins are six at most. However, in order to obtain the maximum output current of 0.8 A, 24 pins are required.

Figure 11:
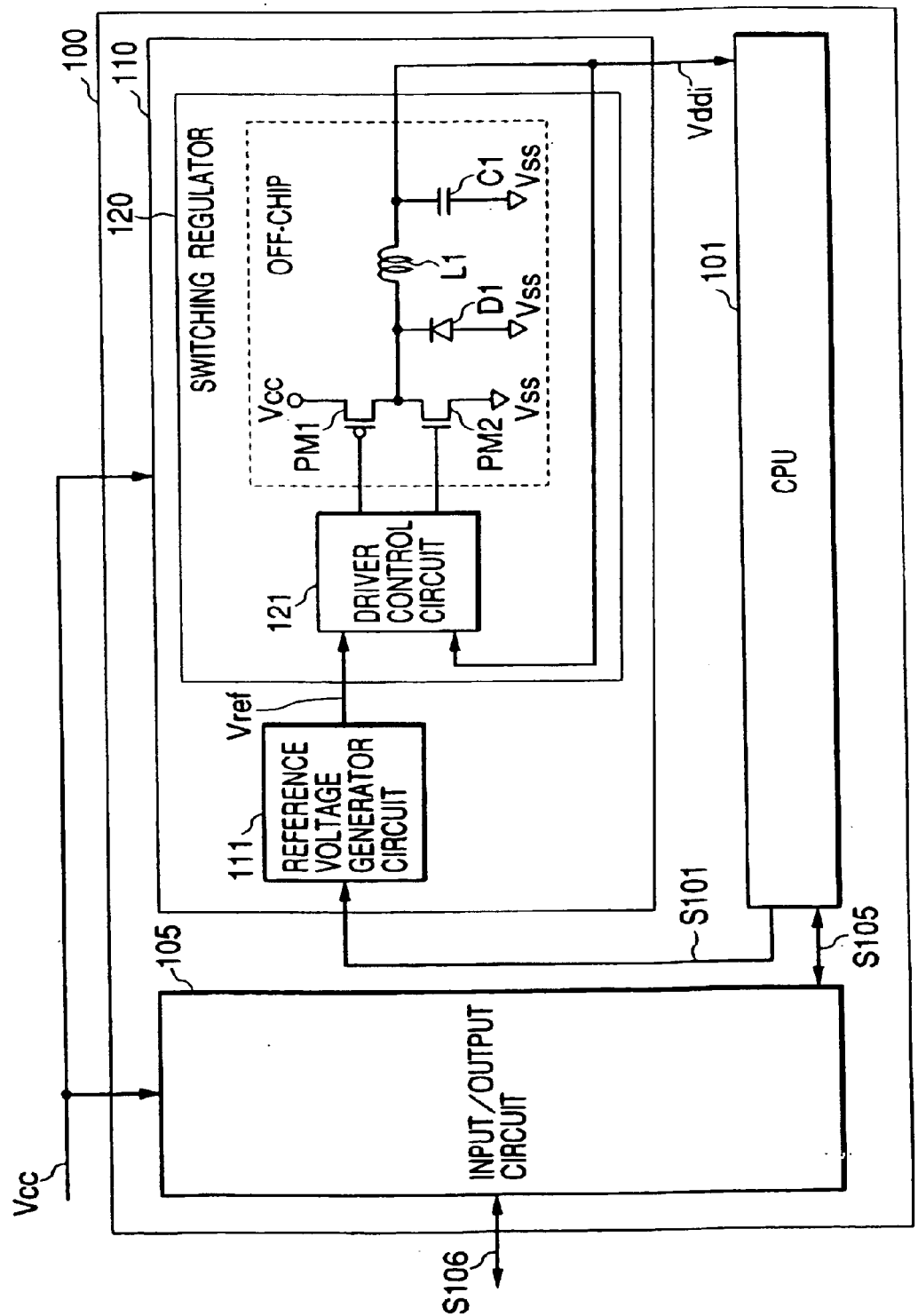
FIG. 11 is a block diagram of an essential part of still another embodiment of an electronic device according to the present invention.

FIG. 11 shows a block diagram of an essential part of another embodiment of an electronic device according to the present invention. The electronic device of this embodiment includes, a pulse output circuit having power MOSFETs PM1 and PM2 having a semiconductor integrated circuit device 100 and its external components and a smoothing circuit having a diode D1, an inductance (coil) L1 and a condenser C1. A battery for generating a power supply voltage Vcc is omitted here.

Supplied from the outside of the semiconductor integrated circuit device 100 is a power supply voltage Vcc to be used for interface between chips. The power supply voltage vcc is fed to an input/output circuit 105 while stepped down to a power supply voltage Vddi by an on-chip regulator circuit 110 in order to be fed to an internal circuit 101. The regulator circuit 110 includes a switching regulator 120. The output power supply voltage Vddi of the regulator 110 is controlled to a substantially equal level to a reference voltage Vref generated by a reference voltage generator circuit 111 in response to a control signal S101 from the internal circuit 101.

The switching regulator 120 includes a on-chip low-pass filter unit (condenser C1, inductance L1 and diode D1), an output circuit (PM1: P channel type, PM2: N channel type) using an off-chip power MOSFET and an on-chip driver control circuit 121 for controlling conduct/non-conduct of the MOSFET of the output circuit.

Since the output circuit includes off-chip output MOSFETs PM1 and PM2 in this embodiment, a switching regulator can be obtained which can obtain a maximum supply current without an increase in the number of pins used for the switching regulator 120. that is, the semiconductor integrated circuit device 100 may needs two external terminals only for supplying control signals generated by the driver control circuit 121 to gates of the P-channel type MOSFET PM1 and the N channel type MOSFET PM2 of the output circuit. As a result, the number of the external terminals does not need to be increased even if the electronic device does not require a large maximum current. It suppresses increases in chip size and costs due to the increase in the number of pins, which allows reduction in the size and costs of the electronic device.

In general, an electronic device directs to the direction that the electronic device is built in a semiconductor integrated circuit device as much as possible in order to reduce a number of components. However, in the above-described switching regulator, the present inventor hereof has realized that a big problem is caused that the number of pins are increased because only two power MOSFETs are formed in the semiconductor integrated circuit device.

On the other hand, a switching regulator is formed by defining a power MOSFET and a driver control circuit for controlling it on one-chip. However, such semiconductor integrated circuit device is relatively expensive in price and not so easy to handle. That is, as in this embodiment, mounting the driver control circuit 212 within the semiconductor integrate circuit 100 and handling elements for forming the output MOSFET or the smoothing circuit as an external components reduces costs substantially. In addition, a single MOSFET is advantageous in universality since it may be substantially lower in cost and correspond to a required maximum output current.

Figure 12:
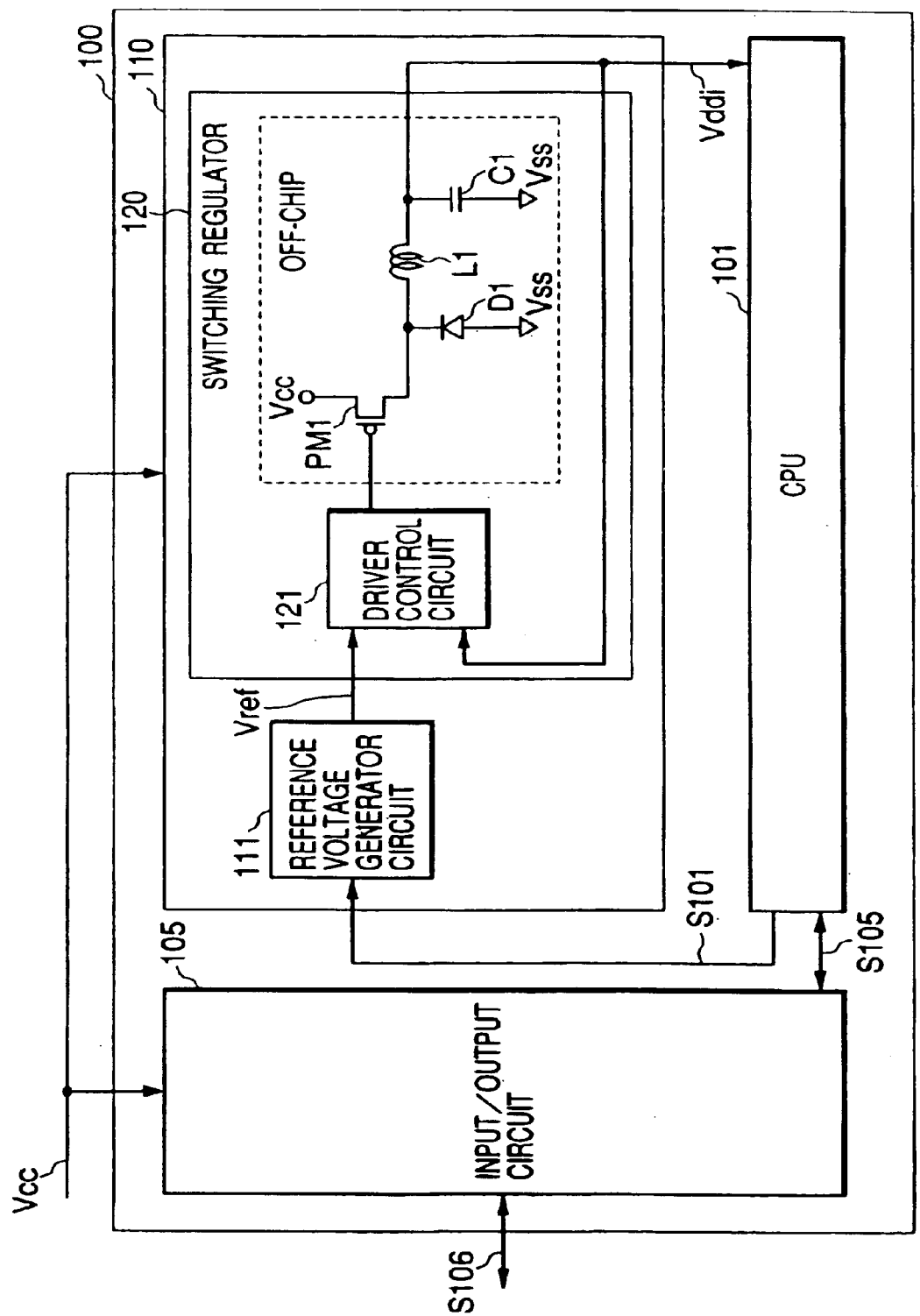
FIG. 12 is a block diagram of an essential part of still another embodiment of an electronic device according to the present invention.

FIG. 12 shows a block diagram of an essential part of another embodiment of an electronic device according to the present invention. In the electronic device of this embodiment, the output transistor (PM2: N channel type) is omitted from the embodiment in FIG. 11. The power conversion efficiency to the switching regulator 120 in this embodiment is lower than that in the embodiment in FIG. 11, but it is advantageous in cost since an off-chip parts count is one fewer. That is, the current Ivss as described with reference to FIG. 9 can be generated by the diode D1. In this case, since a voltage loss is caused in the forward direction voltage VF by the diode D1, it is advantageous in the electronic device, which requires lower costs with some deterioration in the power conversion efficiency.

Figure 13:
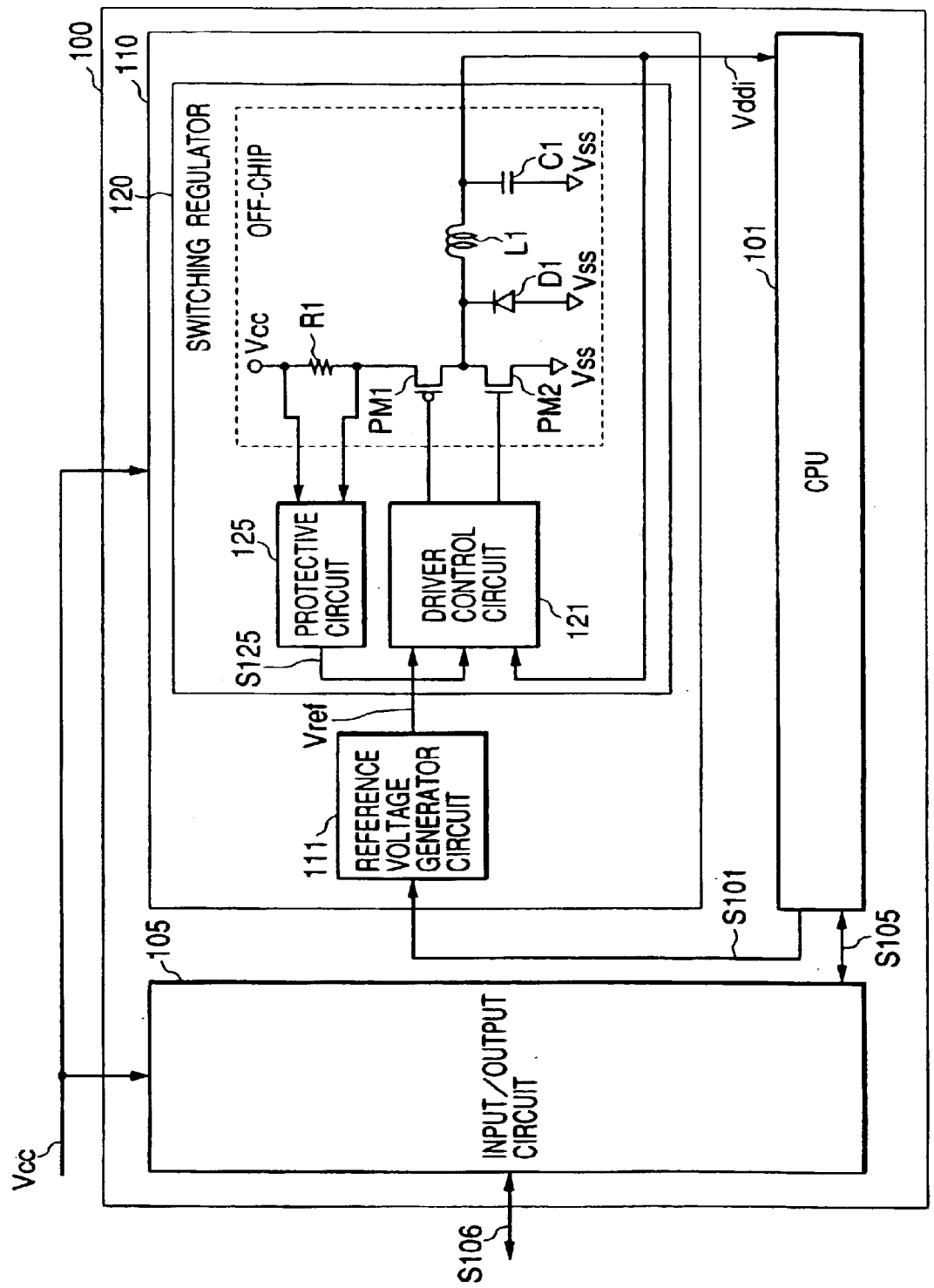
FIG. 13 is a block diagram of an essential part of still another embodiment of an electronic device according to the present invention.

FIG. 13 shows an essential block part of still another embodiment of an electronic device according to the present invention. In this embodiment, an off-chip resistance R1 and an on-chip protective circuit 125 are added to the configuration in the embodiment in FIG. 11. That is, when current equal to or larger than a certain value flows through output MOSFET PM1, a potential detector circuit included in the protective circuit 125 detects that a potential difference across the resistance R1 exceeds the certain value. The protective circuit 125 controls the driver control circuit 121 through a control signal S125 in order to cause the output MOSFET PM1 non-conductive temporally. Thus, this embodiment can prevent excessive current flows through the output of the switching regulator 120, which can enhance reliability of the switching regulator 120.

Figure 14:
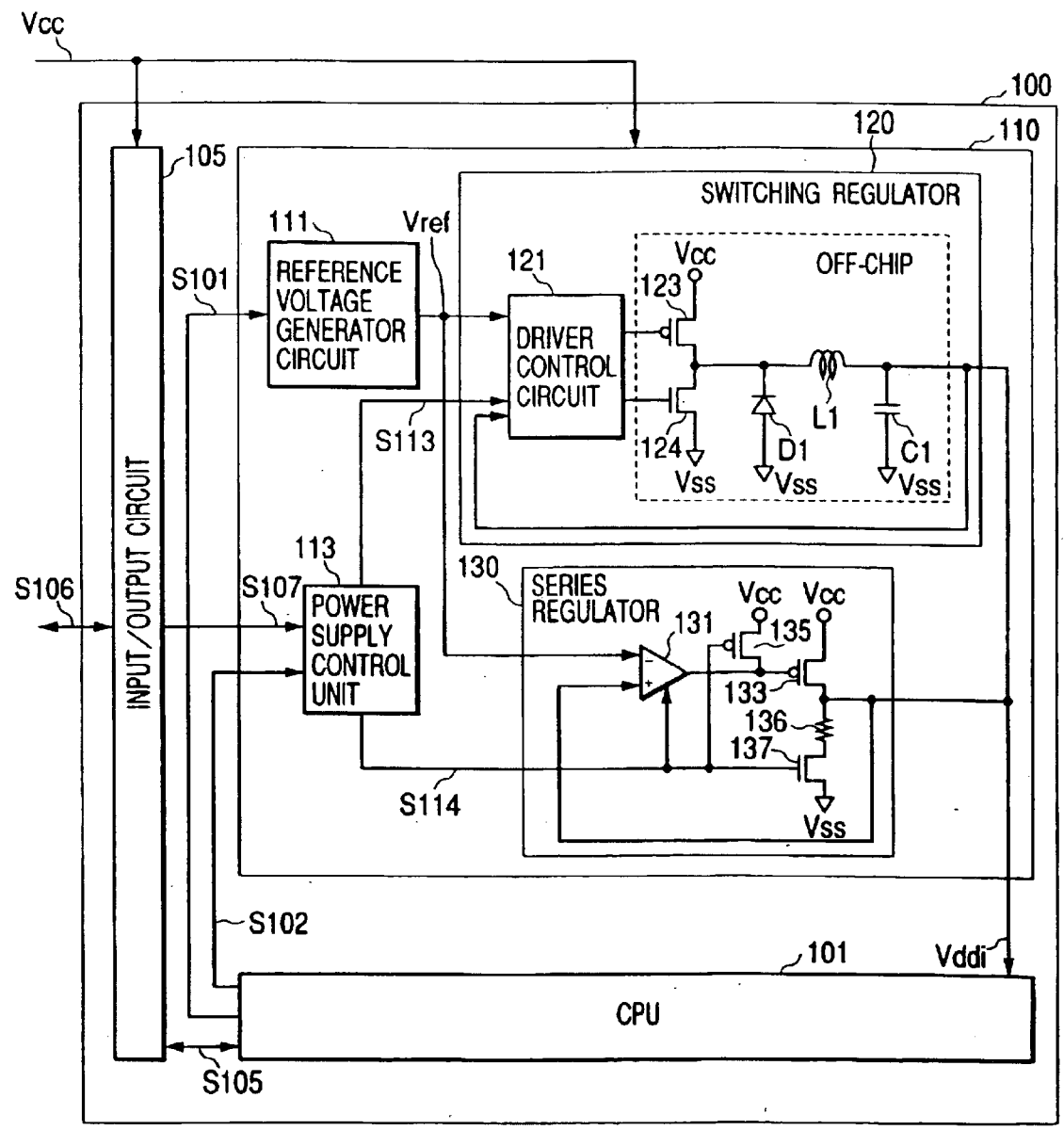
FIG. 14 is a block diagram of an essential part of still another embodiment of an electronic device according to the present invention.

FIG. 14 shows a block diagram of an essential part of another embodiment of an electronic device according to the present invention. In this embodiment, as in the embodiment in FIG. 11, a maximum output current can be obtained without an increase in the number of pins used for a step-down power supply circuit. In addition, as in the embodiment in FIG. 1, even if the internal circuit is in a light loaded state such as the stand-by state, too much deterioration in power conversion efficiency of the step-down power supply circuit can be avoided. That is, MOSFETs 123 and 124 for forming the output circuit of the switching regulator 120 in the embodiment in FIG. 1 are formed by on-chip external components.

As a result, a maximum output current can be obtained without an increase in the number of pins used for a step-down power supply circuit. In addition, even if the internal circuit is in a light loaded state such as the stand-by state, too much deterioration in power conversion efficiency of the step-down power supply circuit can be avoided. Thus, reduction in size and power consumption of the electronic device can be achieved.

Figure 15:
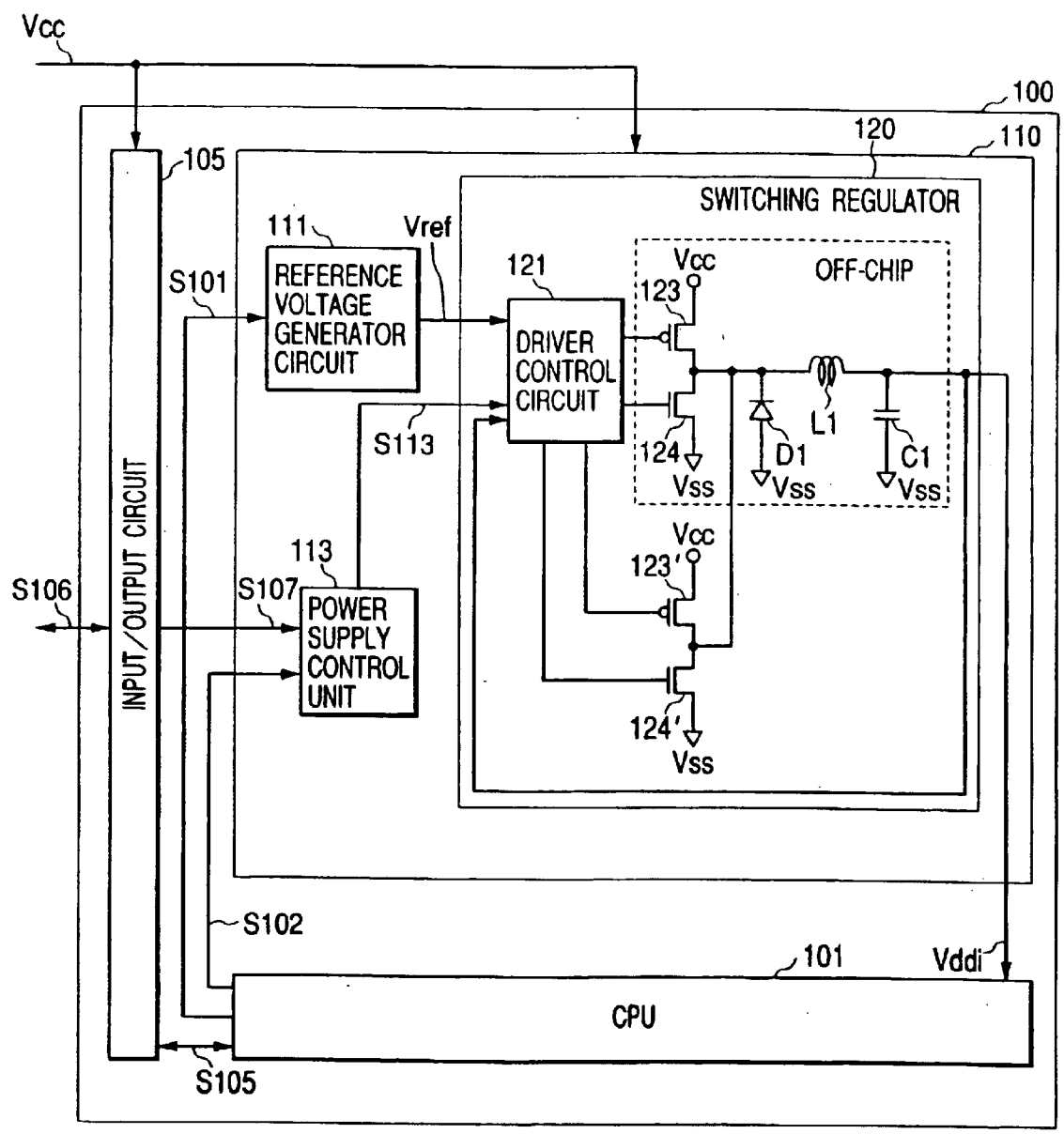
FIG. 15 is a block diagram of an essential part of still another embodiment of an electronic device according to the present invention.

FIG. 15 shows a block diagram of an essential part of another embodiment of an electronic device according to the present invention. In this embodiment, as in the embodiment in FIG. 11, a maximum output current can be obtained without an increase in the number of pins used for a step-down power supply circuit. In addition, as in the embodiment in FIG. 4, even if the internal circuit is in a light loaded state such as the stand-by state, too much deterioration in power conversion efficiency of the step-down power supply circuit can be avoided. That is, MOSFETs 123 and 124 for forming the output circuit of the switching regulator 120 in the embodiment in FIG. 4 are formed by on-chip external components.

As a result, a maximum output current can be obtained without an increase in the number of pins used for a step-down power supply circuit. In addition, even if the internal circuit is in a light loaded state such as the stand-by state only by the switching regulator 120, too much deterioration in power conversion efficiency of the step-down power supply circuit can be avoided. Thus, reduction in size and power consumption of the electronic device can be achieved.

The configuration of the switching regulator for obtaining a large maximum output current without increasing the number of pins used for the step-down power supply circuit can be applied to the case in FIGS. 5, 6, 7 and 8. That is, forming the output MOSFETs 123 and 124 of the switching regulator 120 by Off-chip external components allows lower power consumption without deteriorating the power conversion efficiency of the step-down power supply circuit when the internal circuit 101, for example is the light load state such as the stand-by state.

Figure 16:
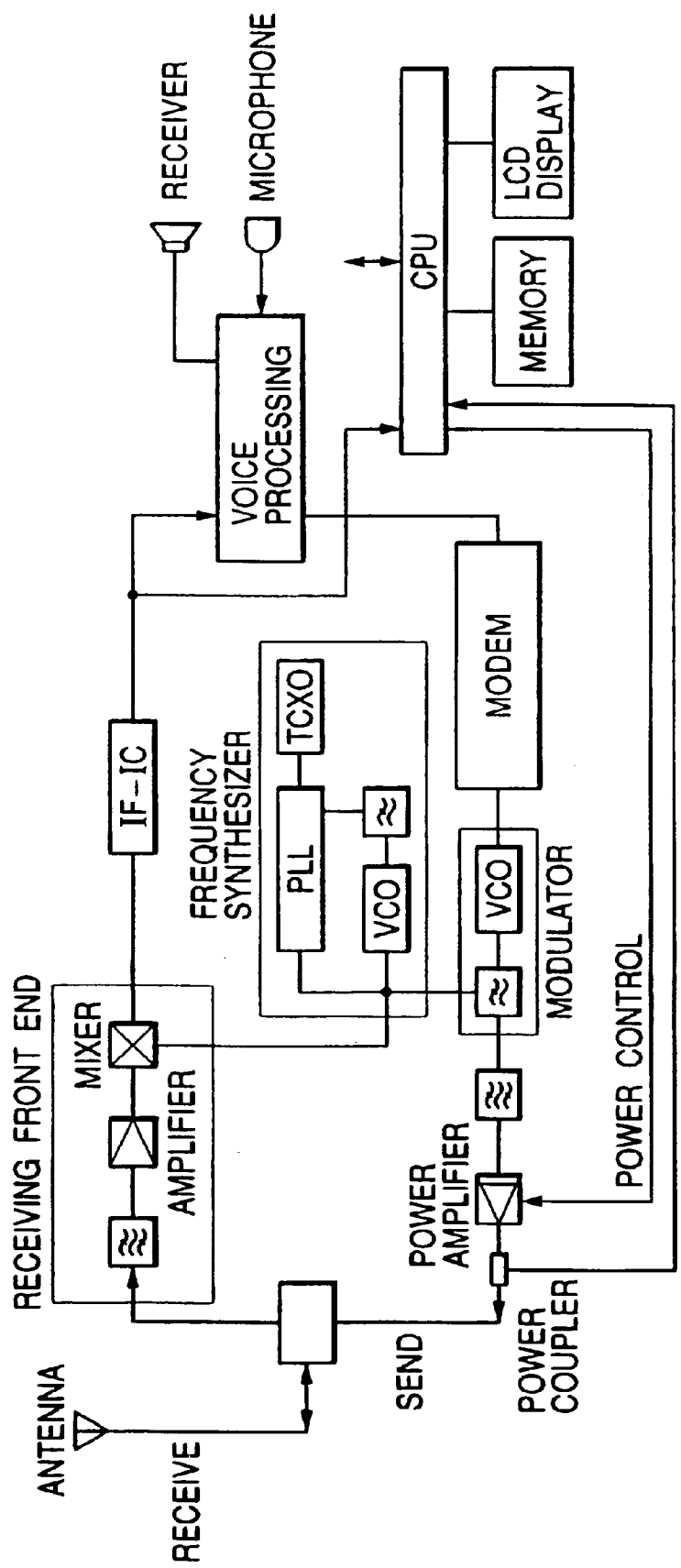
FIG. 16 is a whole block diagram showing one embodiment of a mobile communication device to which the present invention may be applied

FIG. 16 shows a whole block diagram of one embodiment of a mobile communication device to which the present invention is applied. A typical example of the mobile communication device is a cellular phone. A signal received by an antenna is amplified in a receiving front-end, converted to an intermediate frequency by a mixer and transmitted to a voice processing circuit through an intermediate signal processing circuit IF-IC. A gain control signal includes periodically in the received signal is, but not limited to, decoded in a microprocessor CPU so that an input control voltage is formed, which is supplied to a power amplifier (power amplifier module) here.

In the power amplifier, gain control is performed in accordance with the input control voltage to from a sending output signal. The sending power is fed back to the microprocessor CPU partially through a power coupler, for example. A frequency synthesizer forms an occilating signal corresponding to a received frequency through a reference oscillator circuit TCXO, a voltage control oscillator circuit VCO and a PLL loop and the oscillating circuit is transmitted to the mixer in the receiving front end on one end. The oscillating signal is supplied to a modulator on the other end. In the voice processing circuit, the received signal drives a receiver in order to output a voice signal. A sending voice is converted to electronic signals through a microphone and transmitted to the modulator through the voice processing circuit and a modem.

In the mobile communication device, 1-chip semiconductor integrated circuit device is formed in an available region with respect to CPU for size reduction. For example, a memory may be the RAM array described above, and an analog circuit may be the frequency synthesizer. In such an electronic device, the total power supply voltage Vcc may be about 3.3 V. One to which a lower operational voltage can be applied such as the semiconductor integrated circuit device including CPU can allow decreases in power consumption and costs by using the step-down regulator as described above. When both memory and analog circuit are provided, an output from the second series regulator in FIGS. 6 and 7 are power-supplied to the analog circuit in the active state or in the stand-by state. When in the CPU shut-down/RAM data holding state, it is controlled to be power supplied to the memory so that propagation of switching noises to the analog circuit can be avoided and allows lower power consumption in the RAM data holding.

Operational effects which can be obtained from the embodiments above are as follows:

(1) For an internal circuit having a first operation mode consuming a first operational current and a second operation mode consuming a second operational current, which is smaller than the first operational current, a first step-down type regulator for stepping down a predefined output power supply voltage from an input power supply voltage and having a current supply ability corresponding to the first operational current of the internal circuit and a second step-down type regulator having a current supply ability corresponding to the second operational current are combined in order to, under the control of a power supply control unit, operate the first step-down type regulator in response to a first control signal instructing the first operation mode in the internal circuit and to operate the second step-down type regulator in response to a second control signal instructing the second operation mode. In this case, the internal circuit and power supply control unit are provided in one semiconductor integrated circuit device so that reduced power consumption and power supply switching in accordance with the operation mode can be achieved.

(2) Further, the first power supply regulator may be a switching regulator having a pulse output circuit formed in the semiconductor integrated circuit device and a smoothing circuit having an inductance and a condenser provided in the outside of the semiconductor integrated circuit device and the second step-down type regulator is a first series regulator formed in the semiconductor integrated circuit device. Thus, further reduction of power consumption can be achieved.

(3) Further, the internal circuit may includes a signal processing unit and a memory unit whose power supply voltage line is isolated by a switch and the second operation mode in the internal circuit includes an operation for turning the switch ON in order to supply current from the first series regulator to the signal processing unit and the memory unit and an operation for turning the switch OFF in order to supply current only to the memory unit. Thus, necessary data can be maintained while source supply for the signal processing unit is shut down, which allows further reduction of power consumption.

(4) The internal circuit may have a signal processing unit and a memory unit whose power supply voltage line is isolated by a switch and a second series regulator for generating the predefined output power supply voltage from the input power supply voltage. In this case, the second operation mode of the internal circuit may include an operation for turning the switch ON in order to supply current from the first series regulator to the signal processing unit and the memory unit and an operation that the first series regulator stops its operation and the second series regulator performs an operation in order to supply current only to the memory unit when the switch is turned OFF. Thus, feeding to the memory unit for data holding by the second series regulator can be minimized.

(5) Further, there may be provided a second series regulator for generating a predefined output power supply voltage from the input power supply voltage and an analog circuit to which an operational voltage is supplied by the series regulator. In this case, the operation of the second series regulator can be stopped at the same time when operations by the switching regulator and series regulators are stopped. Thus, reduction of both power consumption and power supply noises in the analog circuit can be achieved.

(6) Further, there may be provided a third series regulator for receiving the input power supply voltage or the predefined output voltage in order to output a low voltage not more than the predefined output voltage and a partial circuit to which an operational voltage is supplied by the third series regulator. In this case, the operation of the third series regulator can be stopped at the same time when operations by the switching regulator and series regulators are stopped. Thus further reduction of power consumption can be achieved.

(7) In addition, the first step-down type regulator may be a first switching regulator having a pulse output circuit for outputting a pulse formed in a large output transistor corresponding in size to the first operational current formed in the semiconductor integrated circuit device and a smoothing circuit having an inductance and a condenser provided in the outside of the semiconductor integrated circuit device, and the second power supply regulator may be a second switching regulator having a pulse output circuit for outputting a pulse formed in a small output transistor corresponding in size to the second operational current formed in the semiconductor integrated circuit device and the smoothing circuit. As a result, the circuit can be simplified and the power consumption can be reduced also.

(8) The internal circuit may comprise a data processing circuit having a microcomputer function for performing signal processing through a built-in program; and the first operation mode and second operation mode are switched and the first and second control signals are generated in accordance with the program. Thus, appropriate power supply switching can be performed with stability.

(9) The input power supply voltage may be generated by a battery, which can increases a battery life and eases handling of the electronic device.

(10) In an electronic device including a switching regulator for stepping down a predefined output power supply voltage from an input power supply voltage and a semiconductor integrated circuit device including an internal circuit operated by feeding from the switching regulator, the switching regulator may include a driver control circuit formed in the semiconductor integrated circuit device, an output circuit provided in the outside of the semiconductor integrated circuit device for generating an output pulse signal through a drive signal generated by the driver control circuit and an inductance and a capacitor for smoothing the output pulse signal. Thus, a number of pins of the semiconductor integrated circuit device can be decreased regardless of a maximum power supply current, which allows reduction of size and cost in addition to an increase in universality of the regulator circuit.

(11) The output circuit may include a switch MOSFET in which the drive signal is supplied to a gate and the input power supply voltage is supplied to a source and a diode for preventing reverse current, which is provided between the switch MOSFET and a ground potential of the circuit. Thus, a number of parts can be reduced.

(12) In addition, there may be provided a resistance for detecting current of the output circuit and a protective circuit for limiting an operation of the output circuit when a voltage generated in the resistance exceeds a predefined tolerance value. Thus, reliability can be obtained.

(13) Further, in this case, the internal circuit may have a first operation mode consuming a first operational current and a second operation mode consuming a second operation current smaller than the first operation current and the switching regulator may be arranged to have a current supply ability corresponding to the first operational current of the internal circuit. The electronic device may further include a step-down type regulator built-in the semiconductor integrated circuit device and having a current supply ability corresponding to the second operational current and a power supply control unit operating the switching regulator in response to a first control signal instructing the first operation mode in the internal circuit and operating the step-down type regulator in response to a second control signal instructing the second operation mode. Thus, further reduction of the power consumption can be achieved.

(14) In addition, the step-down type regulator is preferably a series regulator. Thus, reduced power consumption is achieved, which is adapted to the second operational current.

(15) In addition, the step-down type regulator may be a switching regulator using a pulse output circuit for outputting pulses generated in a small output transistor corresponding in size to the second operational current generated in the semiconductor integrated circuit device and a switching regulator using the inductance and condenser. Thus, the circuit can be simplified and the reduced power consumption can be obtained which is adapted to the second operational current.

(16) Further, the internal circuit preferably includes a data processing circuit having a microcomputer function for performing signal processing through a built-in program and the first operation mode and second operation mode are switched and the first and second control signals are generated in accordance with the program. Thus, appropriate power supply switching can be performed with stability.

(17) In addition, the input power supply voltage may be generated by a battery, which increases the battery life and eases handling of the electronic device.

The present invention made by the present invention has described concretely based on its embodiment. However, various changes are possible without departing from its principle. For example, the power supply regulator may form an internal voltage stepped down from the input source voltage as in the embodiment above. In addition, it may form an internal voltage, which is substantially equal to a source voltage supplied from an external terminal of the semiconductor integrated circuit and stabilized in order to eliminate influenced of changes in the external source voltage. When a step-up voltage is formed as above, the power supply regulator as above may be used based on a voltage generated by a step-up circuit such as a charge-pump circuit so that an internal voltage stabilized for voltage changes and load current in accordance with a charge-pump operation can be generated.

In the embodiment in FIG. 1, a protective circuit as in FIG. 13 may be provided. The semiconductor integrated circuit device may be formed by combining a CPU, a RAM array, an analog circuit, a partial circuit and an input/output circuit and other circuits required for signal processing. The electronic device, the semiconductor integrated circuit and the data processing system only needs to be one including an internal circuit of the semiconductor integrated circuit operating with stepped-down voltage, in addition to the mobile communication device. The power supply of the electronic device may use a commercial power source in addition to a battery. Alternatively, it may use both battery and commercial power source. The present invention can be applied to an electronic device including a semiconductor integrated circuit whose internal circuit operates with stepped-down voltage, semiconductor integrated circuit and a data processing system.

What is claimed is:

1. A semiconductor integrated circuit formed on a single chip and comprising:

a central processing unit;

an input/output circuit; and an internal supply voltage generating circuit, wherein said central processing unit has a first operational mode consuming a first operational current, and a second operational mode consuming second operational current, wherein said internal supply voltage generating circuit includes a plurality of regulators, and a control circuit controlling said regulators, wherein said control circuit receives a first mode information signal from said central processing unit, and receives a second mode information signal from outside said semiconductor integrated circuit via said input/output circuit, and wherein said control circuit controls said regulators of said internal supply voltage generating circuit according to said mode information signals.

2. A semiconductor integrated circuit according to claim 1, wherein said plurality of regulators include a first regulator providing said first operational current, and a second regulator providing said second operational current, said second operational current being smaller than said first operational current.

3. A semiconductor integrated circuit according to claim 1, wherein said semiconductor integrated circuit receives a power supply voltage, wherein said power supply voltage is provided to said input/output circuit and said internal supply voltage generating circuit, wherein said internal supply voltage generating circuit is constructed to generate a plurality of internal supply voltages using said power supply voltage, and wherein said central processing unit is selectively supplied with said plurality of internal supply voltage.

4. A semiconductor integrated circuit, a central processing unit having a plurality of operation modes, an input/output circuit constructed to receive a plurality of signals from outside;

a voltage terminal which is provided with an external supply voltage; and a voltage generating circuit constructed to generate operation voltages according to said operation modes, wherein said voltage terminal is coupled with said input/output circuit and said voltage generating circuit to provide said supply voltage from a first voltage line, wherein said input/output circuit receives a mode signal from outside, and provides an operation mode control signal selectively indicating said plurality of operation modes to said voltage generating circuit, wherein said voltage generating circuit includes a control circuit receiving said operation mode control signal, and controlling the voltage generating circuit according to the operation mode indicated by said operation mode control signal, said voltage generating circuit being coupled to said central processing unit via a second voltage line, and wherein said plurality of operation modes include a first operation mode for which said voltage generating circuit provides a first operation voltage to said central processing unit via said second voltage line, and a second operation mode for which said voltage generating circuit provides a second operation voltage to said central processing unit via said second voltage line.

5. A semiconductor integrated circuit according to claim 4, wherein said central processing unit consumes a first operation current in said first operation mode and a second operation current smaller than said first operation current in said second operation mode.

6. A semiconductor integrated circuit according to claim 5, wherein said voltage supply circuit includes a first generating circuit providing said first operation current, and a second generating circuit providing said second operation current, and wherein said control circuit controls operation of said first and second generating circuits.

7. A semiconductor integrated circuit according to claim 5, further comprising:

an internal volatile memory, wherein said plurality of operation modes include a third operation mode, wherein said voltage generating circuit is coupled to said internal volatile memory via a third voltage line to provide an operation voltage to said internal volatile memory said third operation made.

8. A semiconductor integrated circuit according to claim 4, wherein said voltage generating circuit includes a first regulator which generates said first operation voltage and a second regulator which generates said second operation voltage.

9. A semiconductor integrated circuit device, comprising:

a central processing unit having a plurality of operation modes;

an input/output circuit coupled to said central processing unit; and a supply voltage generating circuit having a plurality of operation voltage outputs, wherein said supply voltage generating circuit includes a control circuit which controls said supply voltage generating circuit to couple said operation voltage outputs to said central processing unit, selectively, depending upon the operating made of the central processing unit.

10. A semiconductor integrated circuit according to claim 9, wherein said control circuit receives an operation mode control signal and controls said supply voltage generating circuit according to the operation mode indicated by said operation mode control signal.

11. A semiconductor integrated circuit according to claim 10, wherein said control circuit receives said operation mode control signal from said input/output circuit.

12. A semiconductor integrated circuit according to claim 11, wherein said operation mode control signal is externally supplied to said input/output circuit.

13. A semiconductor integrated circuit according to claim 9, wherein said control circuit receives first and second operation mode control signals from said input/output circuit and said central processing unit, respectively, and controls said voltage generating circuit according to respective operation modes indicated by said first and second operation mode control signals.

14. A semiconductor integrated circuit according to claim 9, wherein said plurality of operation modes include a first operation mode in which a first of said operation voltage outputs is coupled to said central processing unit to provide a first operating current, and a second operation mode in which a second of said operation voltage outputs is coupled to said central processing unit to provide a second operating current smaller than said first operating current.

15. A semiconductor integrated circuit according to claim 14, wherein said first and second operation voltage outputs are outputs of first and second regulators, respectively.

16. A semiconductor integrated circuit according to claim 14, further comprising:

an internal volatile memory, and wherein said first and second operation voltage output terminals are coupled to said internal volatile memory via a dedicated voltage supply line for said internal volatile memory in said first and second operation modes, respectively.

17. A semiconductor integrated circuit according to claim 16, wherein said plurality of operation modes include a third operation mode, and wherein said supply voltage generating circuit has an additional operation voltage output which is coupled to said internal volatile memory via said additional voltage line in said third operating mode.

18. A semiconductor integrated circuit according to claim 17, wherein said additional operation voltage output is an output of a third regulator.

* * * * *